(12) United States Patent
Von Bismarck

(10) Patent No.: US 8,695,999 B2
(45) Date of Patent: Apr. 15, 2014

(54) MOVEABLE DEVICE

(75) Inventor: Gregor Von Bismarck, Friedrichsruh (DE)

(73) Assignee: Resint, Curcao (NL)

( * ) Notice: Subject to any disclaimer, the term of this patent is extended or adjusted under 35 U.S.C. 154(b) by 0 days.

(21) Appl. No.: 13/583,653

(22) PCT Filed: Mar. 10, 2011

(86) PCT No.: PCT/EP2011/053620
§ 371 (c)(1),
(2), (4) Date: Nov. 26, 2012

(87) PCT Pub. No.: WO2011/110631
PCT Pub. Date: Sep. 15, 2011

(65) Prior Publication Data
US 2013/0056950 A1    Mar. 7, 2013

(30) Foreign Application Priority Data
Mar. 10, 2010   (DE) ..................... 20 2010 003 434 U

(51) Int. Cl.
*B62M 1/00*   (2010.01)
*B62B 3/02*   (2006.01)
*B62B 3/04*   (2006.01)

(52) U.S. Cl.
USPC ........................... 280/87.041; 280/37; 280/38

(58) Field of Classification Search
USPC ........... 280/30, 37, 38, 87.01, 87.021, 87.041
See application file for complete search history.

(56) References Cited

U.S. PATENT DOCUMENTS

| | | | |
|---|---|---|---|
| 6,425,589 B1 * | 7/2002 | Wu ................................... | 280/30 |
| 6,460,866 B1 * | 10/2002 | Altschul et al. .................. | 280/30 |
| 7,029,015 B2 * | 4/2006 | Lin ............................. | 280/47.26 |
| 7,246,805 B2 * | 7/2007 | Neal et al. ....................... | 280/35 |
| 7,438,302 B2 * | 10/2008 | Nichols .................... | 280/87.041 |
| 7,837,206 B1 * | 11/2010 | Lee .................................. | 280/37 |
| 8,201,837 B2 * | 6/2012 | Dweek ............................ | 280/30 |
| 8,282,113 B2 * | 10/2012 | Veal et al. ................ | 280/87.041 |

(Continued)

FOREIGN PATENT DOCUMENTS

| | | |
|---|---|---|
| FR | 2819478 | 7/2002 |
| WO | WO2008071798 | 6/2008 |
| WO | WO2009141629 | 11/2009 |

OTHER PUBLICATIONS

International Search Report and Written Opinion dated Apr. 21, 2011 from PCT Application No. PCT/EP2011/053620, 10 pages.

*Primary Examiner* — J. Allen Shriver, II
*Assistant Examiner* — Bridget Avery
(74) *Attorney, Agent, or Firm* — Hollingsworth Davis, LLC

(57) ABSTRACT

A device comprising a planar element with a first wheel supported about a first rotary axis, a handle support, and a folding joint connecting the handle support to the planar element pivotal about a first pivotal axis such that in an operating state the handle support is aligned to a planar element at an angle, is provided. At least one second wheel is supported about a second rotary axis, at the distal end of the planar element. The second wheel is pivotal about a second pivotal axis and coupled to the handle support via a mechanism which converts a pivotal motion of the handle support about the first pivotal axis into a pivotal axis of the second wheel about the second pivotal axis such that the second rotary motion of the second wheel shows in the idle state a greater angle to the planar element than in the operating state.

17 Claims, 15 Drawing Sheets

(56) References Cited

U.S. PATENT DOCUMENTS

Figure 1:
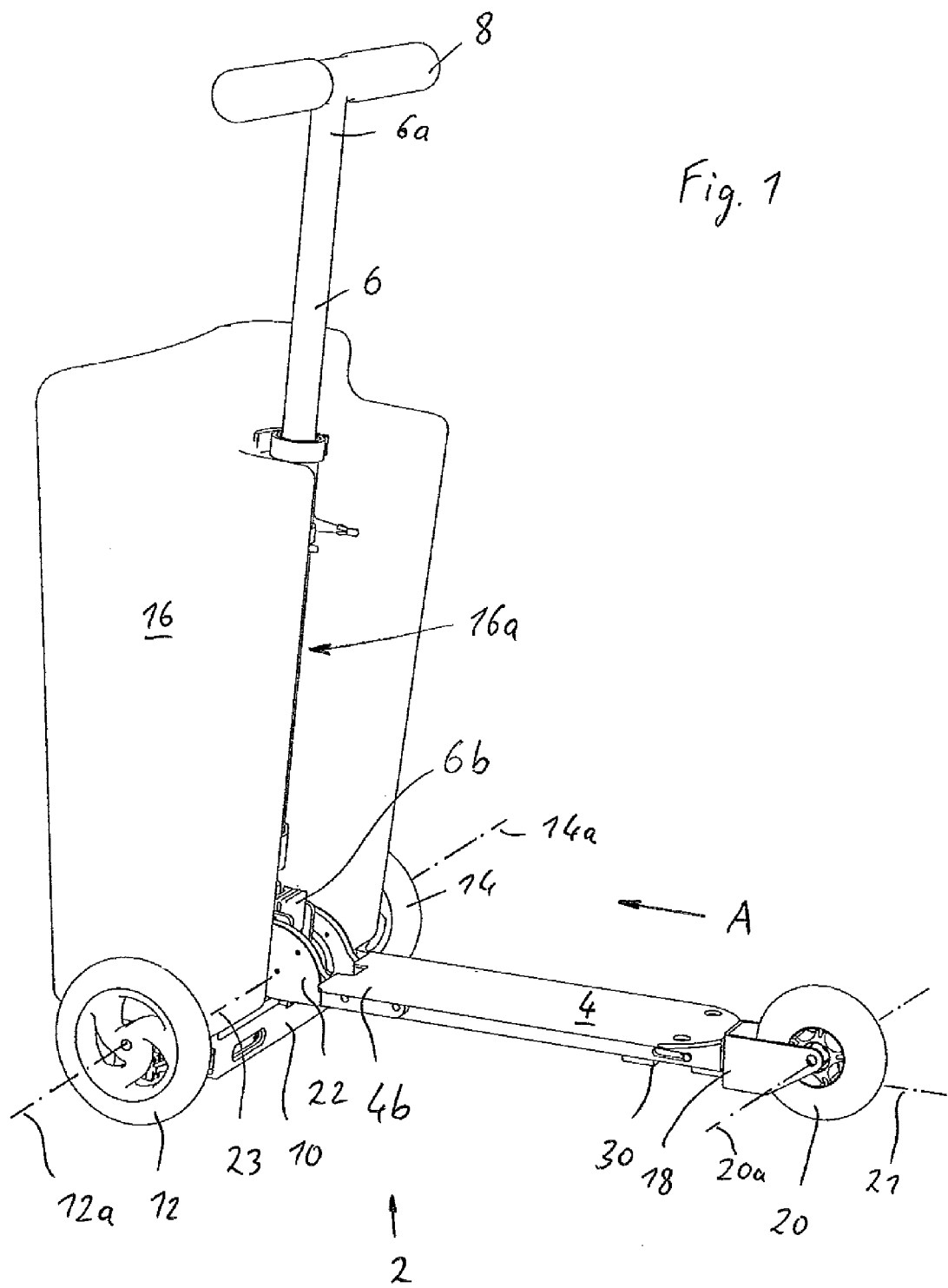

| | | |
|---|---|---|
| 8,469,374 B2 * | 6/2013 | Graf Von Bismarck ... 280/47.26 |
| 2001/0045715 A1 * | 11/2001 | Abraham et al. ............... 280/37 |
| 2003/0042711 A1 * | 3/2003 | Hsu ............................. 280/651 |
| 2004/0056442 A1 * | 3/2004 | Ostrowski et al. ....... 280/87.041 |
| 2004/0094919 A1 * | 5/2004 | Roder et al. .................... 280/30 |
| 2005/0156002 A1 * | 7/2005 | Neal et al. ..................... 224/485 |
| 2010/0213680 A1 * | 8/2010 | Massara et al. .......... 280/87.041 |

* cited by examiner

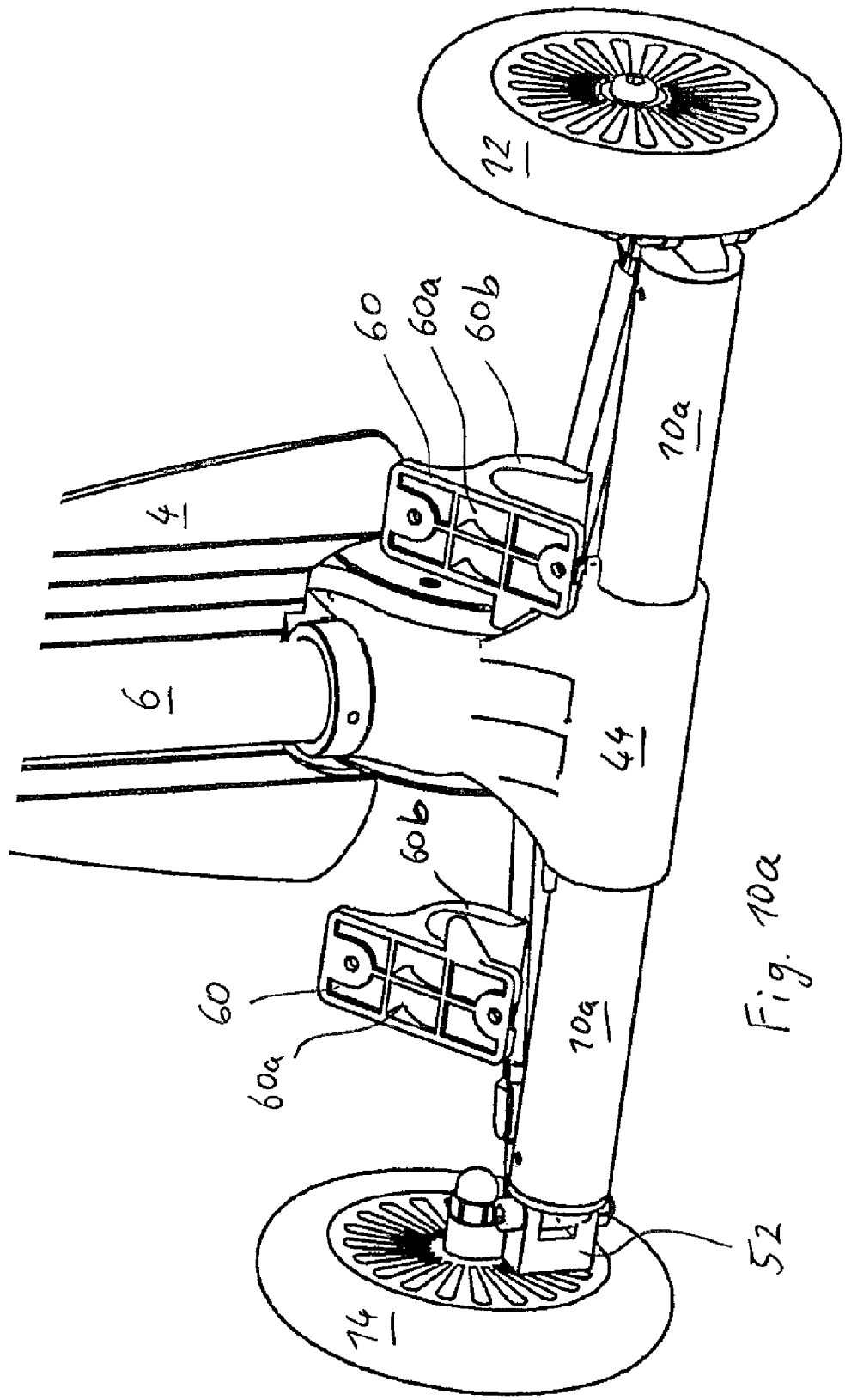

MOVEABLE DEVICE

The invention relates to a moveable device with a planar element, at least a first wheel supported rotational about a first rotary axis, a handle support comprising an end distal in reference to the planar element carrying a handle, and an end proximal in reference to the planar end, a folding link located adjacent to the first wheel, which connects the proximal end of the handle support to the planar element such, pivotal about a first pivotal axis, that in an operating state the handle support is aligned at a preferably right angle or approximately right angle in reference to the planar element, and thus the distal end of the handle support shows a maximum distance from the planar element and in the idle state the distal end of the handle support shows a minimal distance from the planar element, and at least a second wheel supported rotational about a second rotary axis, which is arranged at a far end of the planar element distanced from the arrangement comprising the first wheel and the folding link.

Such a mobile device is commonly embodied as a scooter, kickboard, or a skateboard, which can operate with various steering techniques and different numbers of rolls. When the moveable device is in operation, the wheels rest on a traffic surface or another underground in the operating state, so that the planar element is held at a distance above the traffic surface or the other underground and here is generally aligned approximately horizontally. In this state the planar element serves as the support for a user, who simultaneously holds on to a handle at the upper distal end of the handle support folded up in the operating state. Frequently the handle support can simultaneously be used for steering and for this purpose be embodied as a steering rod or be coupled with such a steering mechanism. The drive for such a moveable device may optionally occur by the physical input of the user, who propels it by a foot pushing against the traffic surface or any other underground, or via a common engine fastened at the planar element, usually comprising a small electric engine or an internal combustion engine.

WO 2008/071 798 A1 discloses a moveable device of the type mentioned at the outset, in which a piece of luggage is mounted at the handle support. Here, the moveable device and the piece of luggage preferably form a unit in the manner of a moveable piece of luggage, which in the folded up state and/or in the idle state of the support plate can be used as a conventional rolling suitcase and in the unfolded state and/or in the operating state as a scooter, in order to this way allow to comfortably travel larger distances.

For the purpose of a space-saving storage or a simple transportation there is the option to bring the handle support and the planar element from an operating state into a space-saving idle state in their relative arrangement and alignment in reference to each other. In the operating state the handle support is unfolded in reference to the planar element and aligned in a preferably right angle or almost right angle, in which the distal end of the handle support shows a maximum distance from the planar element and/or from the far end distanced from the arrangement comprising a first wheel and a folding link. Opposite thereof, in the idle state the handle support and the planar element are arranged in reference to each other such that the distal end of the handle support shows a minimum distance from the planar element and/or from its far end distanced from the arrangement of the first wheel and the folding link, and thus they are preferably adjacent. When using the moveable device with a piece of luggage according to WO 2008/071 798 A1, preferably the piece of luggage can be assembled at the side of the handle support pointing towards the support plate and the folding link can be arranged such that in the idle state the support board is folded up at the lateral side of the piece of luggage facing away from the handle support and essentially contacts it and thus the handle support and the support board enclose the piece of luggage between them.

Even when bringing the moveable device into the idle state in the above-described manner leads to a considerably space-saving arrangement and storage, the objective of the present invention is to even more improve the space-saving effect of the moveable device in the idle state mentioned at the outset.

This objective is attained in a moveable device with a planar element, comprising at least one first wheel supported rotational about a first rotary axis, a handle support with a distal end in reference to the planar element carrying a handle, and a proximal end in reference to the planar element, a folding link located adjacent to the first wheel, connecting the proximal end of the handle support to the planar element pivotally about a first pivotal axis such that in the operating state the handle support is aligned in reference to the planar element in a preferably right angle or almost right angle and thus the distal end of the handle support shows a maximum distance from the planar element and in the idle state the distal end of the handle support shows a minimum distance from the planar element, and at least a second wheel supported rotational about a second rotary axis, which is arranged at a far end of the planar element distanced from the arrangement comprising the first wheel and the folding link, characterized in that the second wheel is additionally arranged at the planar element pivotally about a second pivotal axis extending approximately in the direction of motion and is coupled with the handle support via a mechanism which converts the pivotal motion of the handle support in reference to the planar element about a first pivotal axis into a pivotal motion of the second wheel about the second pivotal axis such that the second rotary axis of the second wheel in the idle state shows a greater angle in reference to the planar element than in the operating state.

Using the design according to the invention the space-saving effect of the idle state is optimized and thus improved. It has shown that the second wheel, which is located at the far end of the planar element distanced from the arrangement comprising the first wheel and the folding link and thus forming the rear wheel offers additional potentials for an optimization and improvement of the space-saving effect in the idle state. Because in order to hold the planar element at a distance above the traffic surface or another underground in the operating state of the moveable device, the rear second wheel appropriately projects from the bottom of the planar element. However, this also applies in the idle state, in which the handle support and the planar element are folded together and thus the bottom of the planar element now quasi forms the exterior of the entire arrangement, from which the second wheel projects outwardly and/or protrudes.

This is disturbing, particularly when the second wheel requires a relatively large space compared to the size of the overall arrangement. Similar circumstances also apply for a moveable device according to WO 2008/071 798 A1, when the second wheel projecting in the idle state requires a large amount of space in reference to the size of the piece of luggage. Although the problem can be reduced by the second wheel showing a smaller diameter, however this leads to worsened driving behavior and driving over small obstacles becomes dangerous.

Accordingly the invention suggests to arrange the second wheel at the planar element additionally pivotal about a second pivotal axis extending approximately in the direction of motion and to couple it with the handle support via a mechanism converting a pivotal motion of the handle support in reference to the planar element about the first pivotal axis into a pivotal motion of the second wheel about the second pivotal axis such that the second pivotal axis of the second wheel in the idle state shows a greater angle in reference to the planar element than in the operating state. During the pivoting of the handle support towards the planar element into the idle state the mechanism provided according to the invention ensures that the second wheel, arranged according to the invention at the planar element pivotal about a second axis extending approximately in the direction of motion is pivoted about this second pivotal axis from an operating position into an idle position. This way, in the idle state the second wheel is quasi pivoted away or folded away and thus no longer projects disturbingly from the planar element. By this design according to the invention the movable device assumes a form more space saving than the one of prior art, and thus the space-saving effect of the idle state is considerably improved.

When unfolding the handle support and thus when the movable device is brought from the idle state into the operating state the mechanism according to the invention ensures that the pivotal position of the second wheel given in the idle state is reversed and the second wheel is pivoted back into its driving position in the operating state and thus the moveable device can once more fulfill its function of driving.

Preferred embodiments and further developments of the invention are disclosed in the dependent claims.

For example, beneficially the second rotary axis of the second wheel shall be aligned in reference to the planar element in the idle state at an angle of approximately 90° and in the operating state at an angle of approximately 0° so that in the operating state the second wheel is standing approximately upright when driving and in the idle state lies approximately in the same level as the planar element and thus is not projecting disturbingly.

A preferred embodiment of the invention is characterized such that the mechanism comprises a pull-push rod, which is linked via a joint at the handle support, distanced from the folding link, and it is guided along a planar element and coupled to a transmission arranged at the planar element, which converts a longitudinal motion of the pull-push rod into a pivotal motion of the second wheel about the second pivotal axis. Due to the fact that the joint and thus the pivotal point of the pull-push rod at the handle support is distanced from the folding link, during the pivotal motion of the handle support about the folding link a change of the distance of said pivotal point from the second wheel occurs, which leads to the above-mentioned longitudinal motion of the pull-push rod. Here, the above-mentioned transmission is embodied such that each longitudinal motion of the pull-push rod coupled to the transmission is converted into a pivotal motion of the second wheel about the pivotal axis.

For an arrangement of the above-mentioned pull-push rod disturbing as little as possible the joint should be arranged at a point of the handle support, which in the operating state is at or below the bottom of the planar element, and the pull-push rod shall be arranged at the bottom of the planar element.

The above-mentioned transmission may be preferably embodied such that it shows a preferably sheath-shaped rotational body, pivotal about the second pivotal axis however essentially supported locally fixed in the axial direction, with a groove being embodied at its jacket, at least angular in reference to the second pivotal axis, into which the pin-shaped cam element projects, arranged at the pull-push rod. The groove extending angular in reference to the second pivotal axis, into which the pin-shaped cam element project, arranged at the pull-push rod, ensures that the longitudinal motion of the pull-push rod is converted into a rotary motion of the rotary body, which leads to a respective pivotal motion of the second wheel about the second pivotal axis.

Beneficially the second wheel shall be supported at a fork pivotal about the second rotary axis, which fork is arranged at the planar element pivotal about the second pivotal axis. In connection with the above-mentioned further development it is advantageous to align the fork and the rotary body axially in reference to each other and connected with each other in a torque-proof fashion.

In order to adjust to the size of the person using it, on the one hand, and to improve storage in the idle position, on the other hand, the handle support shall comprise at least two elements arranged telescopic in reference to each other.

When the moveable device shall be steered the first wheel should additionally be supported pivotal about an angular third pivotal axis, extending preferably approximately rectangular in reference to the rotary axis such that a pivotal motion about this third pivotal axis causes a change of the direction of motion, the handle support represents a steering rod, and a steering mechanism is provided converting a certain motion of the handle support into pivotal motions of the first wheel about the third pivotal axis.

Preferably the handle support comprises means, preferably centrally and/or symmetrical, in order to fasten a piece of luggage at the handle support, as suggested for example in WO 2008/071 798 A1.

In a further development a third wheel is provided at an axial distance from the first wheel, which is supported identically to the first wheel, with the axial distance being at least slightly greater than the width of the section of the piece of luggage to be fastened at the handle support located between the first wheel and the third wheel. By using two front wheels distanced from each other a more stable and thus considerably improved driving behavior can be yielded, particularly when a piece of luggage is fastened at the handle support as the payload. For an optimized steering here the third wheel should additionally be supported at a fourth pivotal axis extending preferably approximately perpendicular in reference to the first rotary axis such that a pivotal motion about this fourth pivotal axis causes a change of the direction of motion and the steering mechanism is provided to also convert certain motions of the handle support into pivotal motions of the third wheel about the fourth pivotal axis.

In a further development of the above-mentioned embodiment latching means are provided for latching the steering mechanic, embodied such that they latch the steering mechanic only in the idle state in a neutral position, preferably for a motion approximately straight ahead. This further development also represents another independent aspect of the invention. The latching of the steering in the idle position of the support board is advantageous in order to prevent any increase of the effective width by a steering of the front wheels, particularly into one of the two end position, which otherwise required increased space in the idle state. Another advantage of the latching option for the steering according to the invention comprises that in the idle state the movable device with a piece of luggage fastened thereat can be used like a trolley and thus can be pulled by the user.

For a detachable latching of a piece of luggage at a section of the moveable device, particularly a lateral bar, here preferably suitable latching means are used, preferably comprising holding clips.

Beneficially the planar element serves as a support board.

Preferably the handle support and the planar element shall be arranged approximately parallel in reference to each other in the idle state and/or essentially located side-by-side, which leads to another particularly space-saving arrangement.

Figure 2:
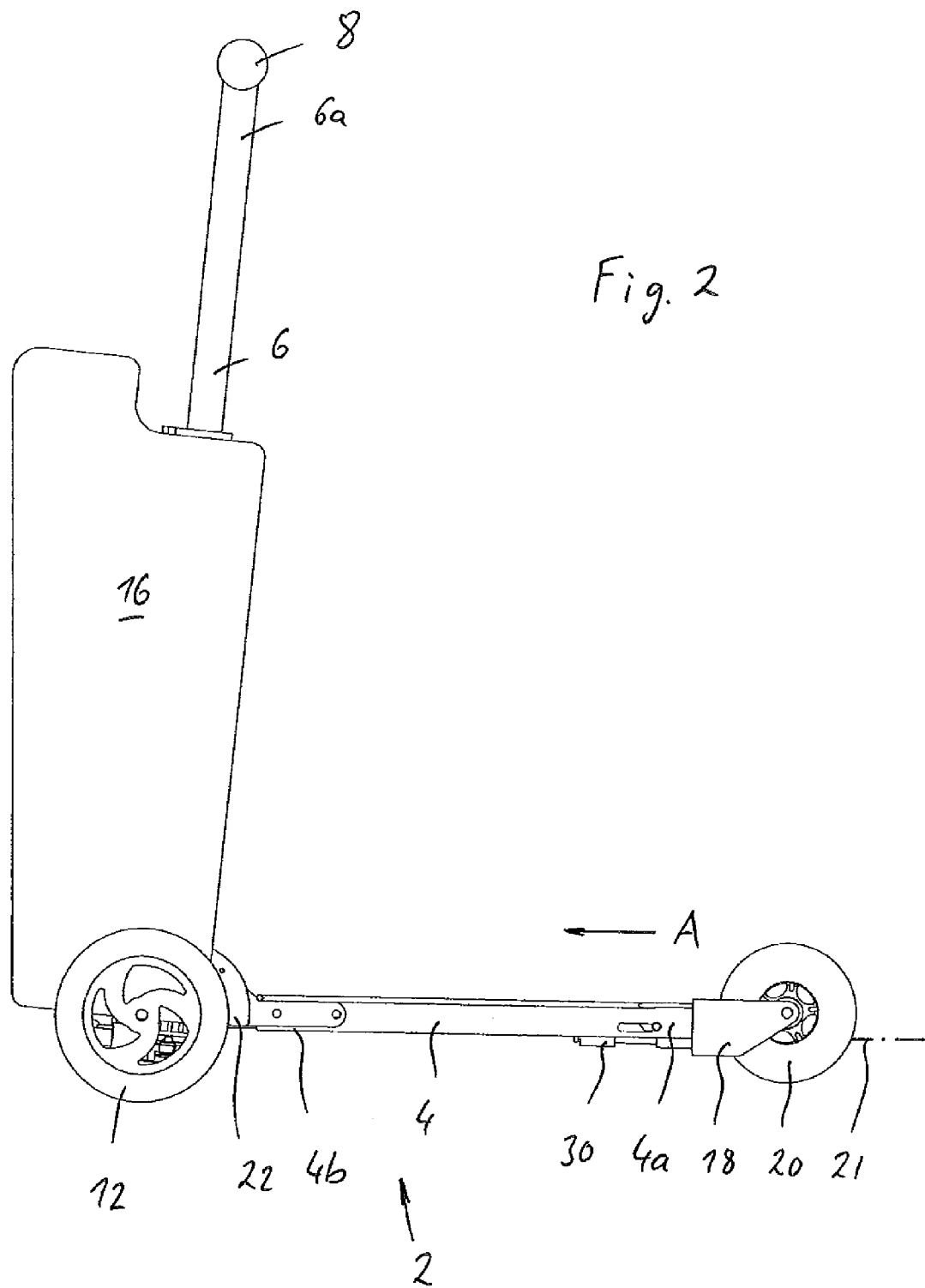
Figure 3:
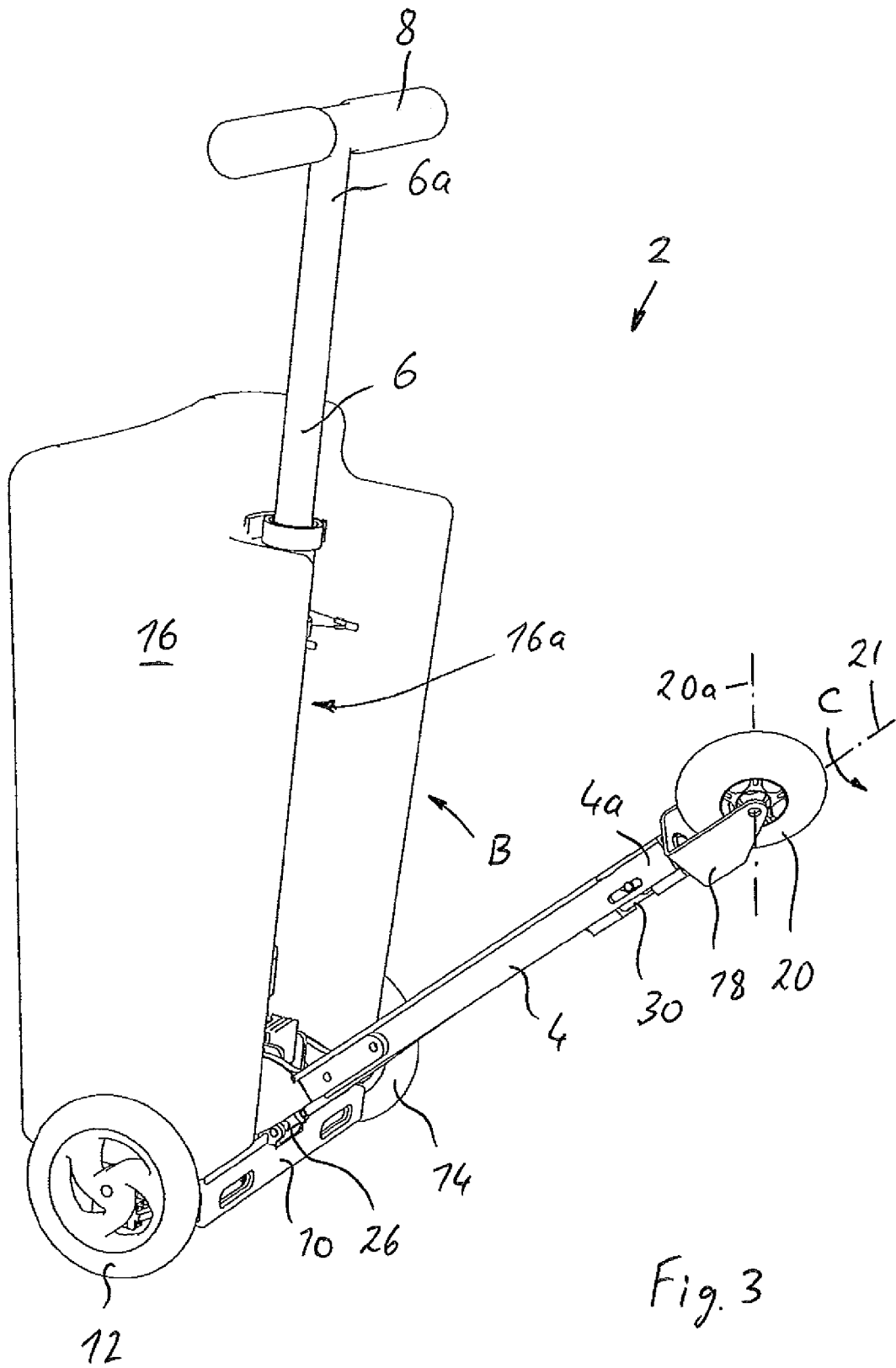
Figure 4:
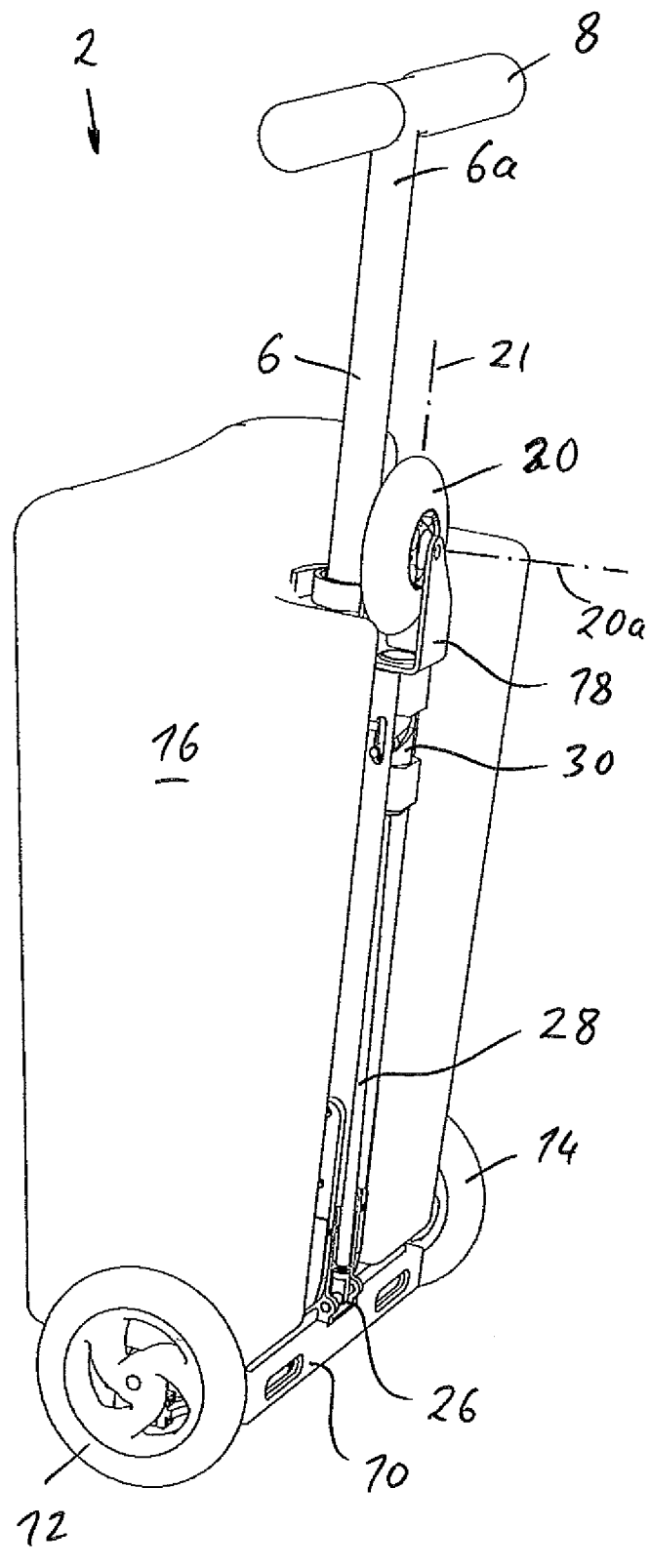
Figure 5:
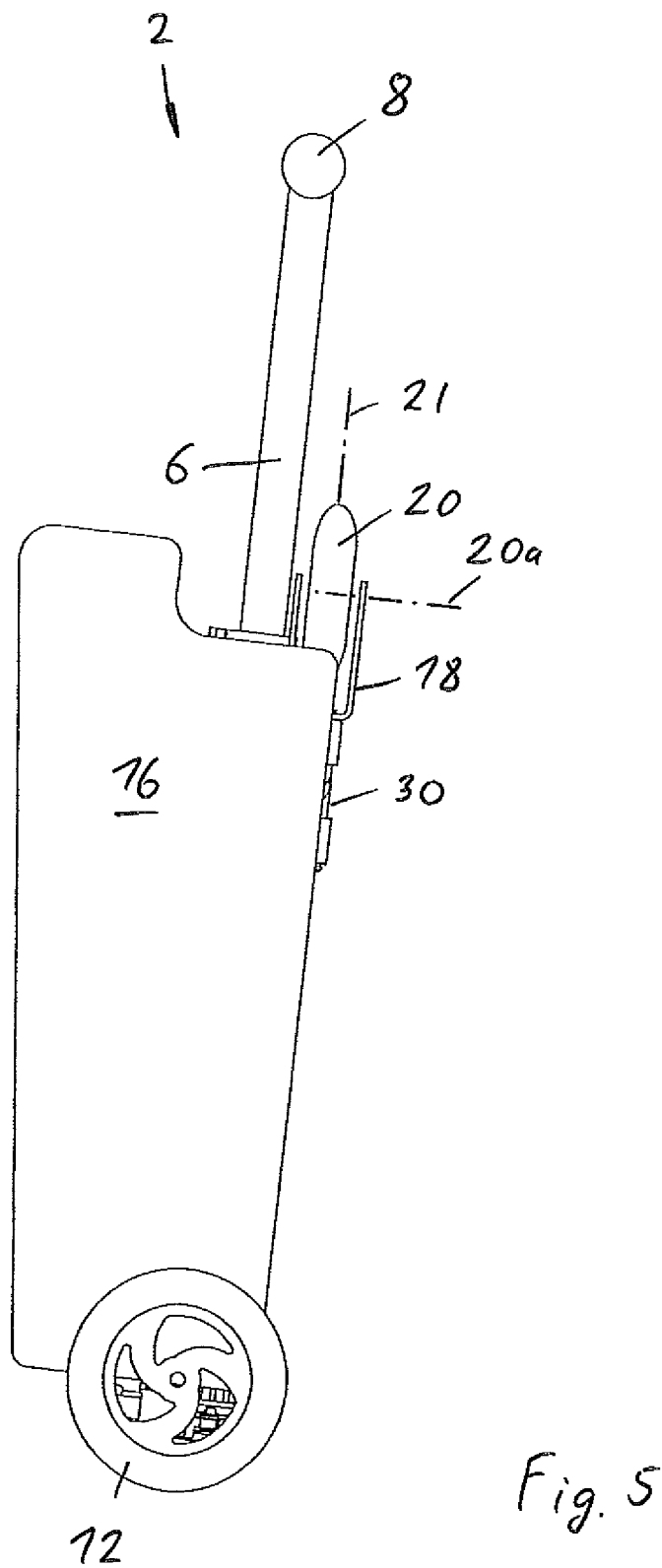
Figure 6:
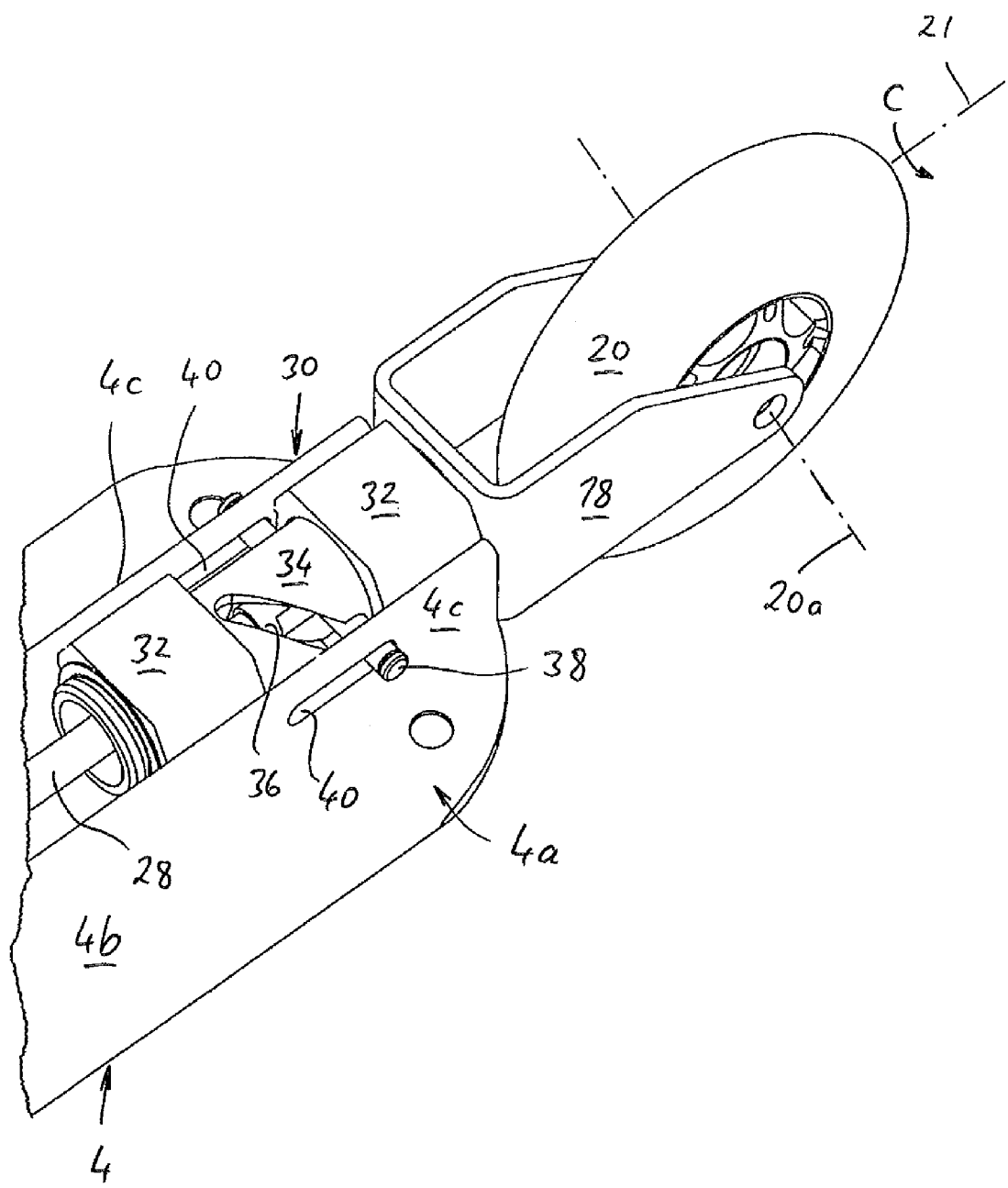
Figure 7:
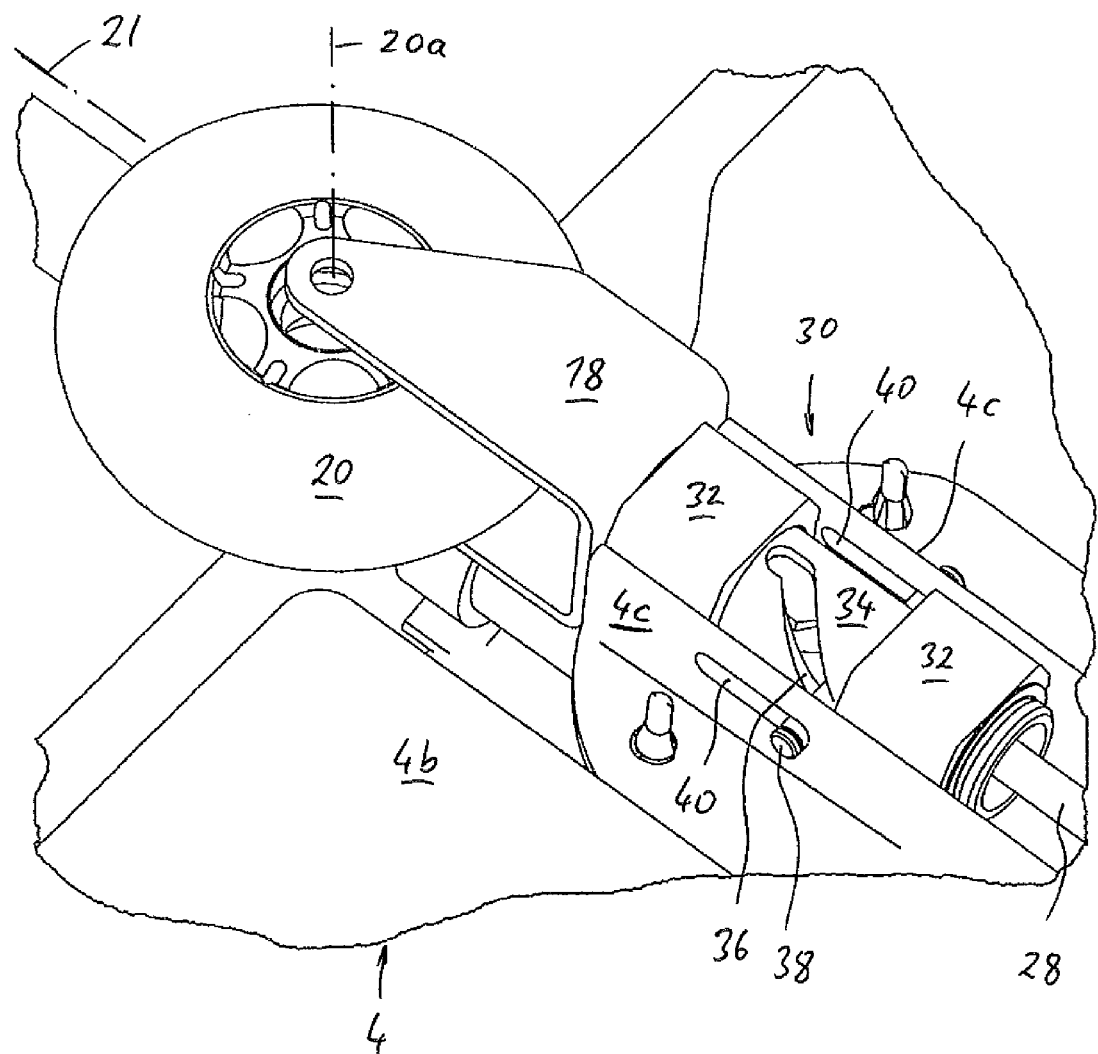
Figure 8:
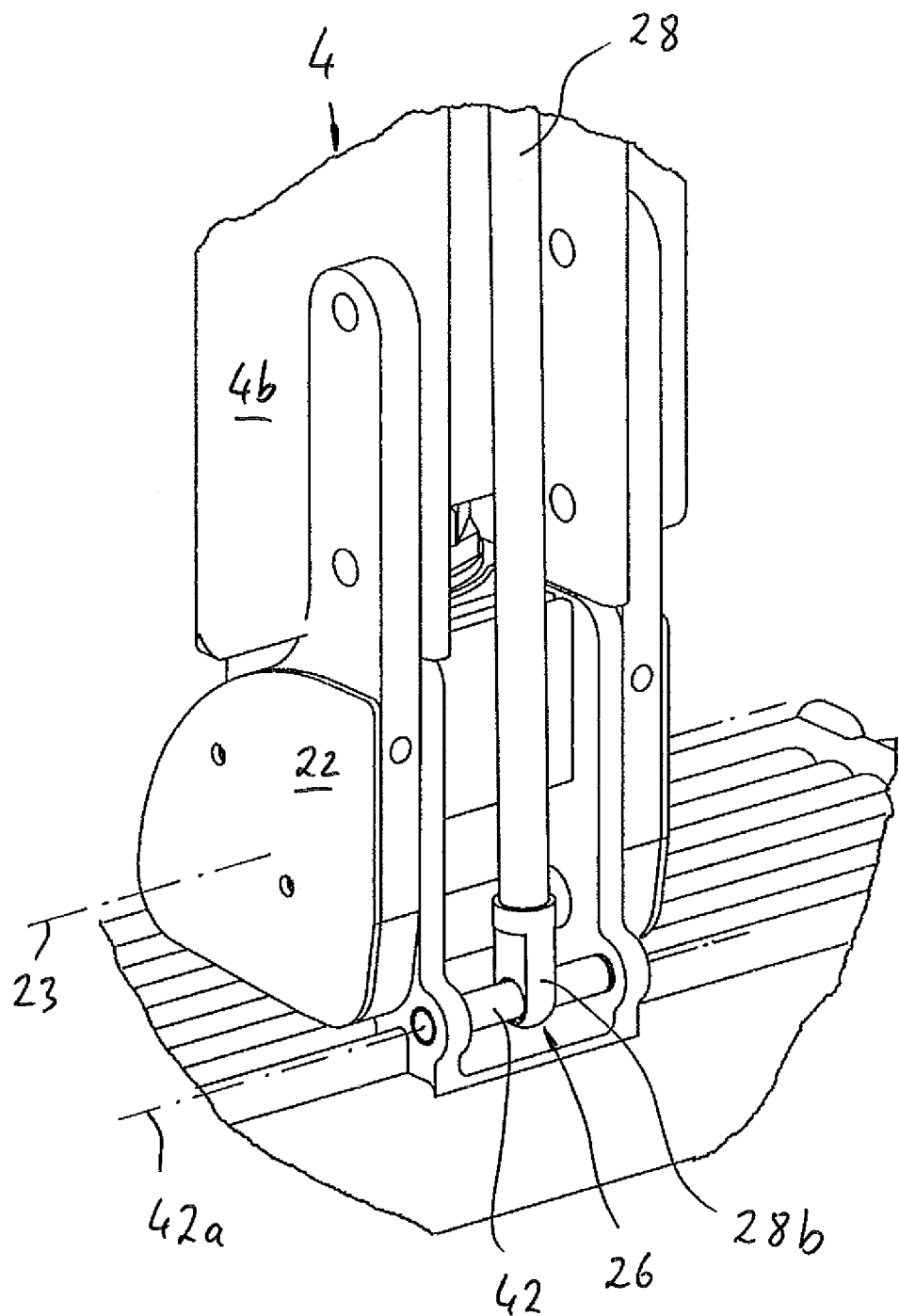
Figure 9:
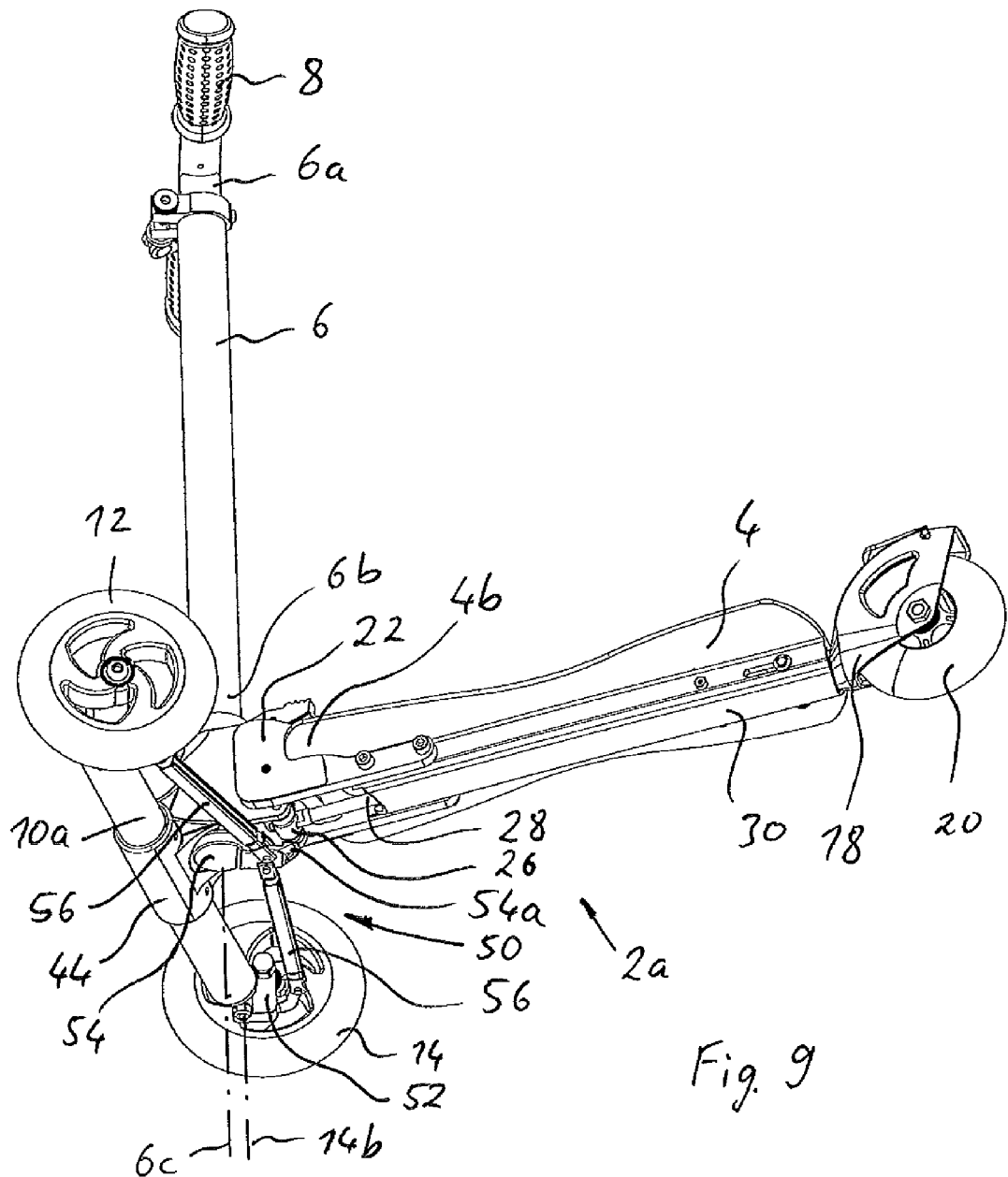
Figure 10:
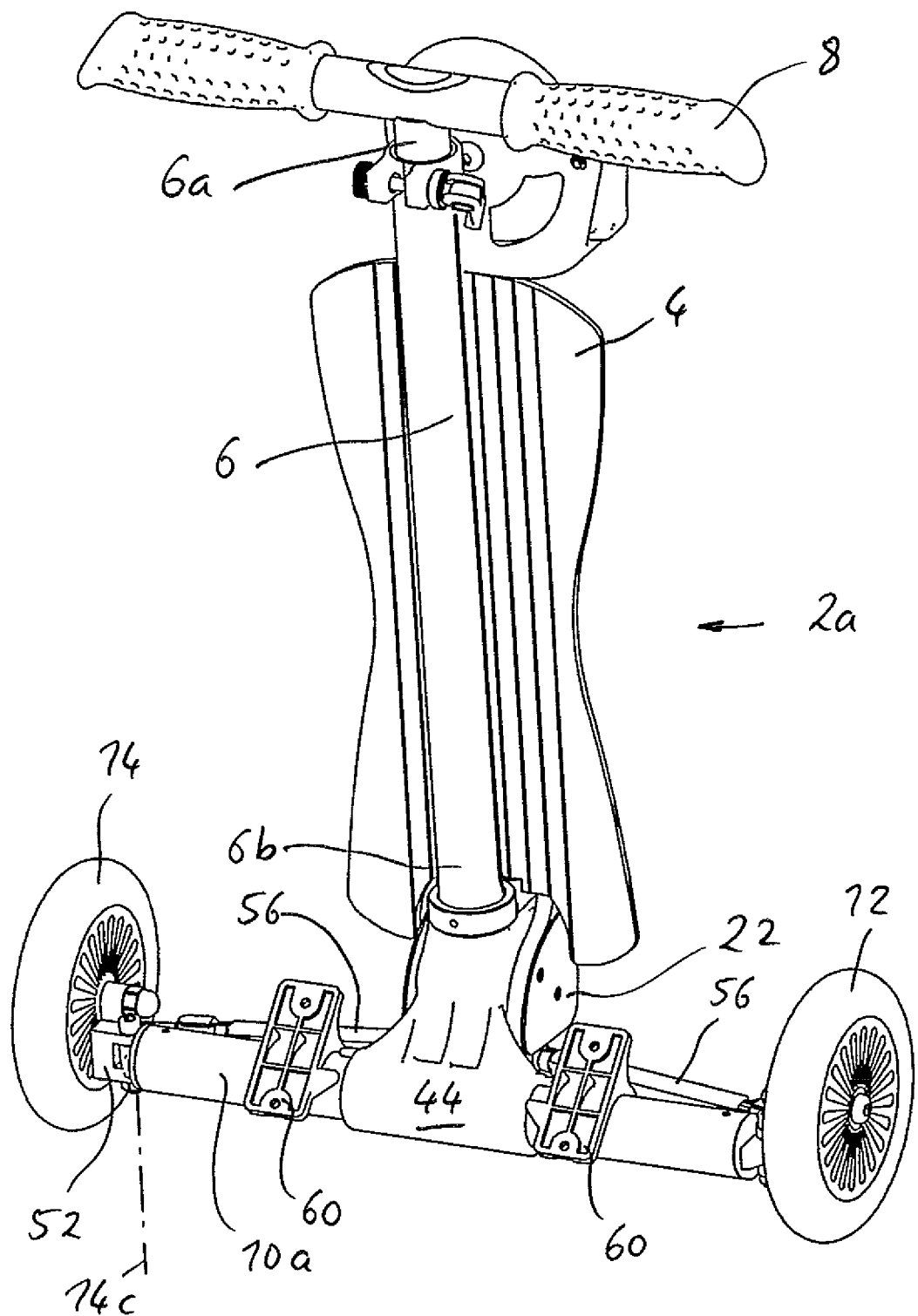
Figure 11:
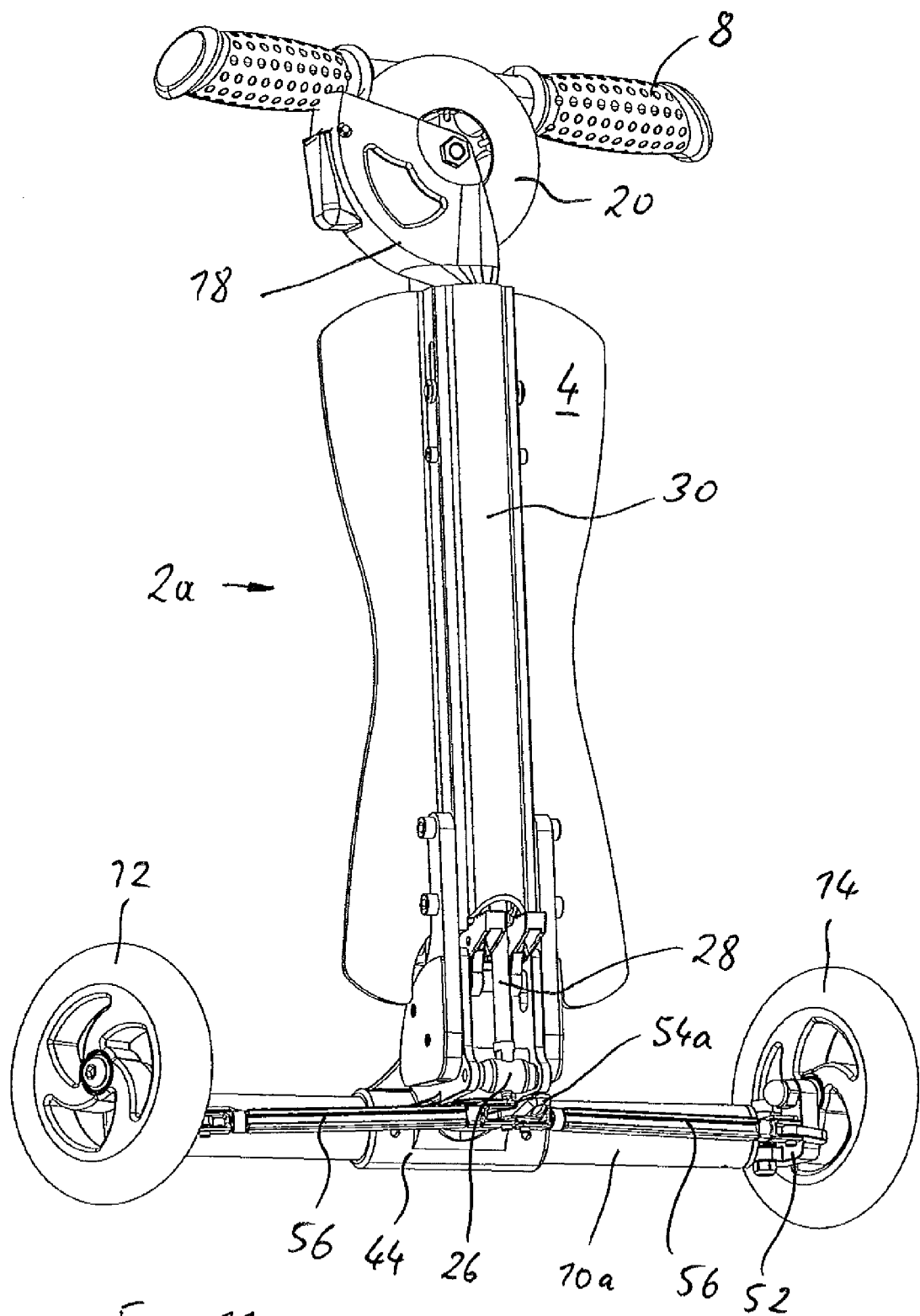
Figure 11A:
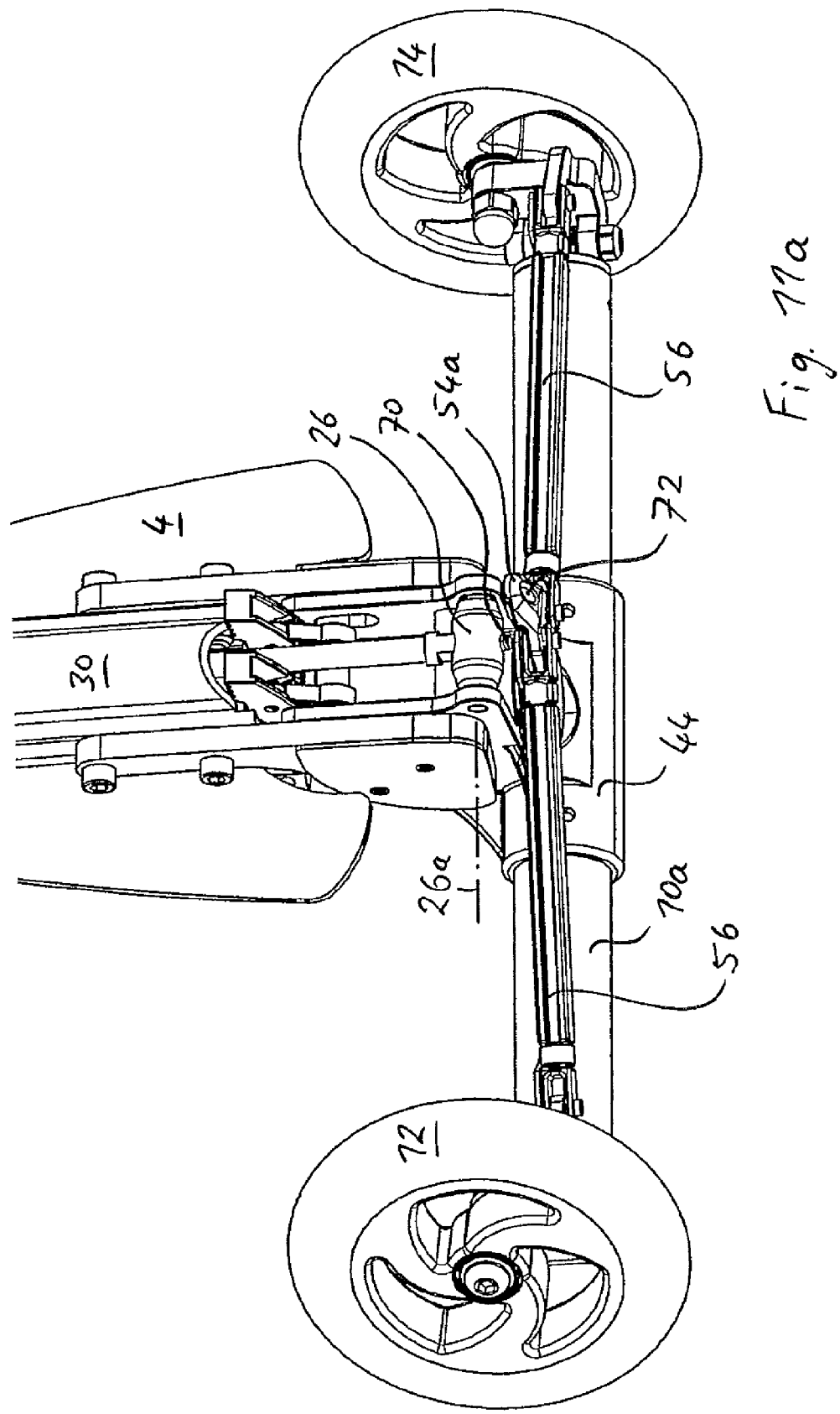
Figure 12:
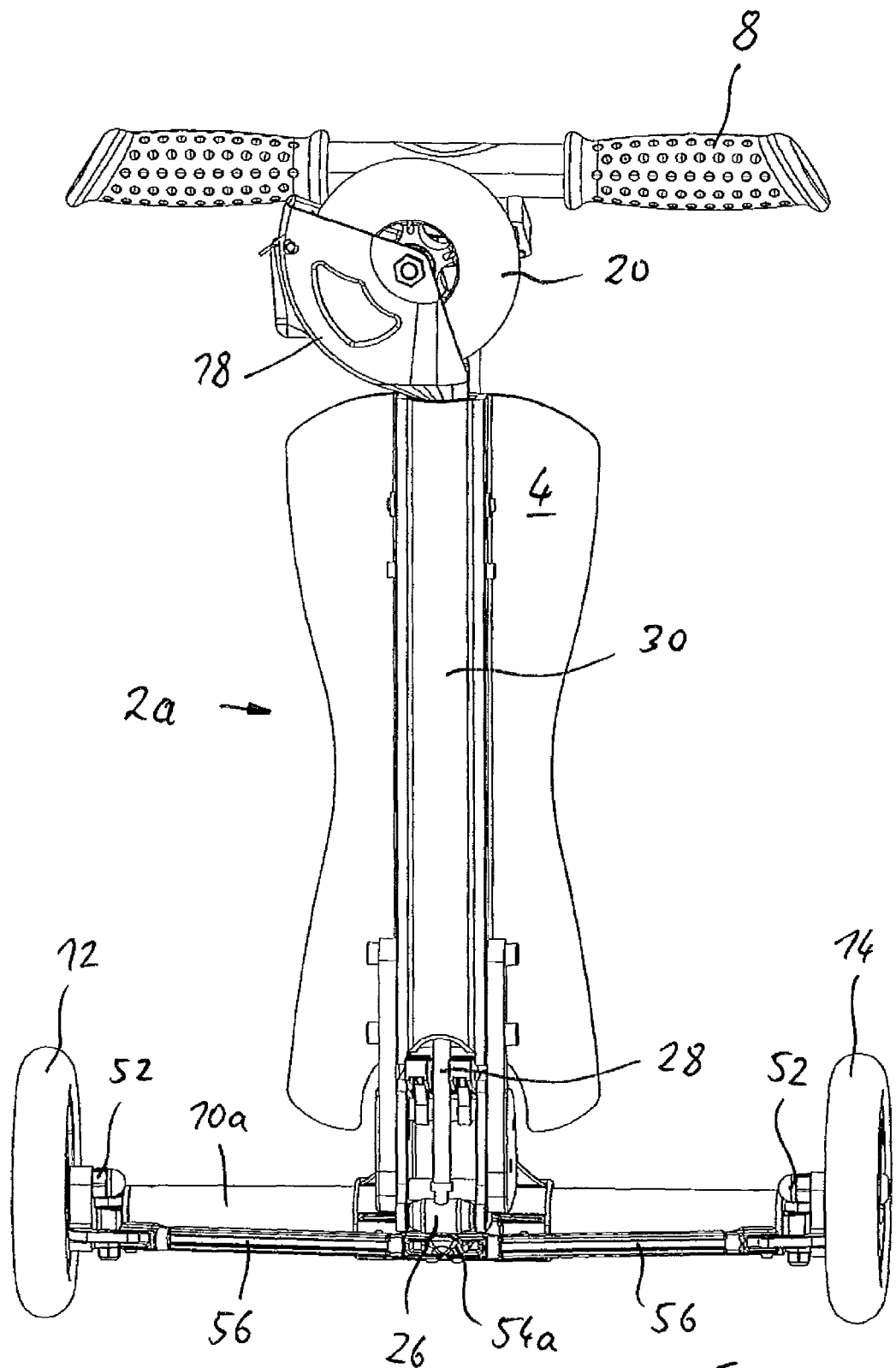
Figure 12A:
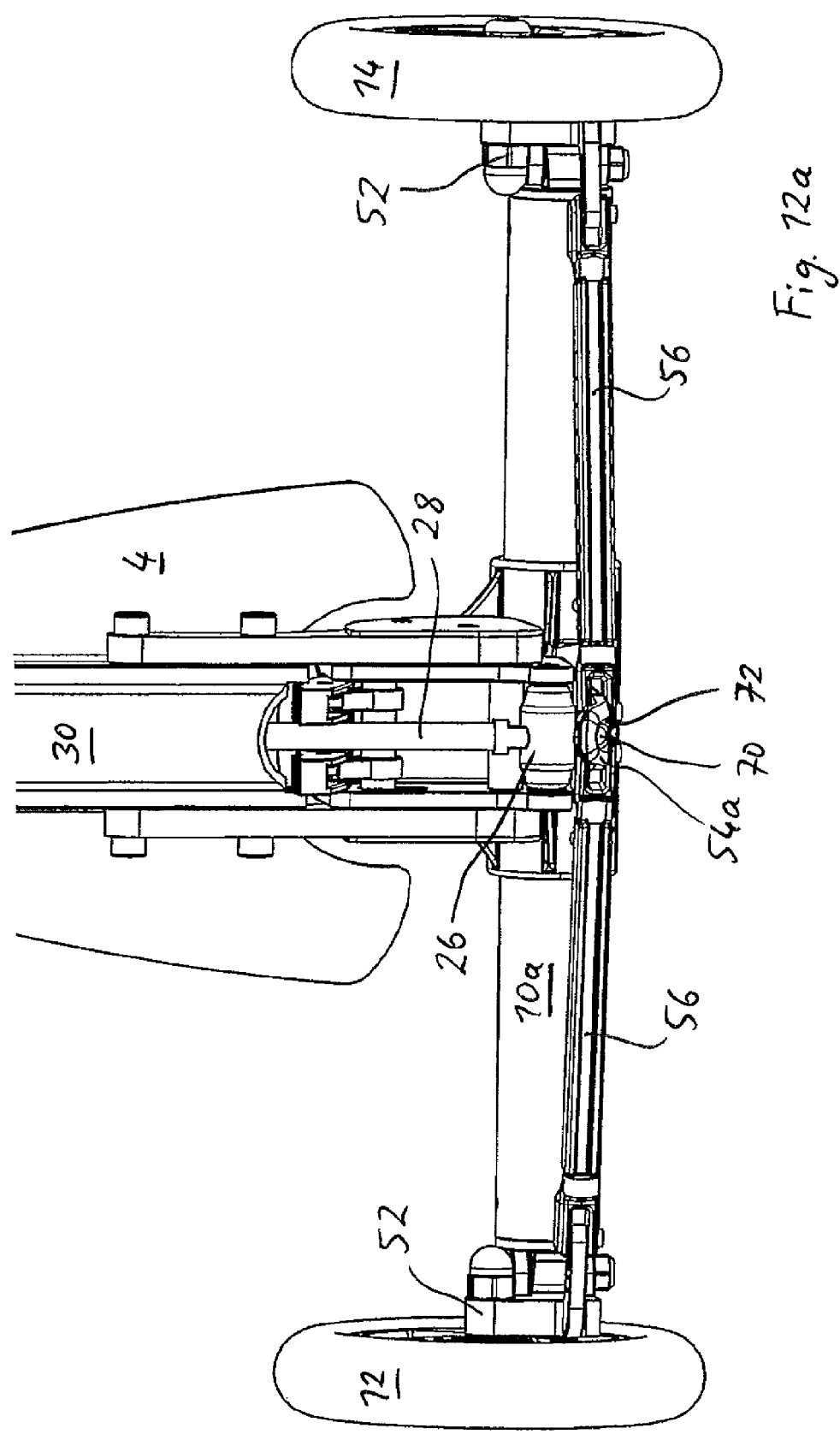

In the following, a preferred exemplary embodiment of the invention is explained in greater detail using the attached figures. It shows:

FIG. 1 a perspective illustration of a mobile device according to a first preferred exemplary embodiment with a piece of luggage in an operating state;

FIG. 2 a side view of the moveable device of FIG. 1 in the operating state;

FIG. 3 a perspective illustration of the moveable device of FIG. 1 in an intermediate state transferring from the operating state according to FIGS. 1 and 2 into an idle state FIG. 4 a perspective illustration of a moveable state of FIG. 1 in the idle state;

FIG. 5 a side view of a moveable device of FIG. 1 in the idle state;

FIG. 6 an enlarged detail of the bottom of the rear end section of the support board of the moveable device of FIG. 1 in the operating state;

FIG. 7 an enlarged detail of the bottom of the rear end section of the support board of the moveable device of FIG. 1 in the idle state;

FIG. 8 an enlarged detail of the connection area between the support board and a lateral bar of the moveable device of FIG. 1 in the idle state;

FIG. 9 a perspective illustration of the moveable device according to a second preferred exemplary embodiment in the operating state with the piece of luggage taken off;

FIG. 10 a perspective illustration of the moveable device of FIG. 9 in the idle state with the holding clips fastened thereat;

FIG. 10a an enlarge detail of FIG. 10 with the holding clips removed;

FIG. 11 a perspective illustration of the moveable device of FIG. 9 with the front wheels turned in a steered position in the idle state;

FIG. 11a an enlarge detail of FIG. 11;

FIG. 12 a perspective illustration of the moveable device of FIG. 9 with the steering latched in the central position in the idle state; and FIG. 12a an enlarged detail of the illustration of FIG. 12.

The FIGS. 1 through 8 show a preferred first embodiment of a moveable device 2, which is embodied like a foldable scooter with a support board 4 and a handle support 6. In FIGS. 1 and 2 the moveable device 2 is shown in an unfolded operating state, in which the handle support 6 is arranged at an angle of slightly less than 90° in reference to the horizontally aligned support board 4. Accordingly, in the exemplary embodiment shown the handle support 6 is almost upright in the operating state, with its distal end 6a, carrying a handle 8 simultaneously forming the upper end. The proximal opposite end 6b of the handle support 6 is assembled on a lateral bar 10, which in the exemplary embodiment shown, seen in the direction of motion according to the arrow A, is arranged in front of the support board 4 and below the level formed underneath the support board 4. As discernible from FIG. 1, for example, at one end of the lateral bar 10 a first front wheel 12 is arranged, rotational about a rotary axis 12a, and at the opposite other end of the lateral bar 10 a second front wheel 14, rotational about a rotary axis 14a.

In the exemplary embodiment shown further a piece of luggage 16 is fastened at the handle support 6 and on the lateral bar 10. This way, in the exemplary embodiment shown the moveable device 2 assumes the function of a moveable piece of luggage or a rolling suitcase. As particularly discernible in FIGS. 1 and 3, in the exemplary embodiment shown, the piece of luggage 16 shows an oblong, inwardly curved section 16a, with the handle support 6 extending through it along the exterior of the piece of luggage 16. As further discernible particularly from FIG. 1 the length of the lateral bar 10 is respectively adjusted to the width of the lower section of the piece of luggage 16 so that the front wheels 12, 14 are located outside the piece of luggage 16. In this context it shall be pointed out, though, that the use and assembly of a piece of luggage is not mandatory, but rather different types of payloads may be arranged or the moveable device 2 shown may also be used without any payload.

In order to steer the moveable device 2 a respective steering mechanism may be provided, which is not shown in FIGS. 1 through 8. Here, the handle support 6 serves as the steering rod, which is rotational by a respective pivoting of the handle 8 about its longitudinal axis in the direction of steering. Further, in this case the two front wheels 12, 14 are pivotal about a pivotal axis, not shown in the figures, which form the steering axis and which commonly is aligned approximately at a right angle or an almost right angle in reference to the respective axis of rotation 12a and/or 14a, and in the operating state is essentially approximately upright. The steering mechanism, not shown, converts the rotary motion of the handle support 6 about its longitudinal axis into a simultaneous steering motion of the two front wheels 12, 14 about the above-mentioned pivotal axes. In this context, it shall be mentioned that the two front wheels 12, 14 and thus their rotary axes 12a, 14a are always aligned approximately parallel in reference to each other and in case of a straight forward motion of the two rotary axes 12a, 14a they are essentially aligned to each other.

As further discernible in the figures, a fork 18 is arranged at the rear and/or distal end 4a of the support board 4, at which a rear wheel 20 is between its legs, supported rotationally about a rotary axis 20a. In general it is also possible to provide more than one rear wheel, for example arranged behind each other or side-by-side. Thus, the fork 18 forms a bearing for the rear wheel 20 at the support board 4. Although the fork 18 is arranged locally fixed at the rear end 4a of the support board 4, however supported thereat pivotally about a pivotal axis 21, which extends approximately in the longitudinal direction of the support board 4 and approximately parallel in reference to a virtual level stretched by the support board 4 and thus also approximately in the direction of motion in the operating state according to the arrow A shown in FIGS. 1 and 2. This way, the rotary axis 20a of the rear wheel 20 extends approximately perpendicular in reference to the pivotal axis 21. This means, that upon rotating the fork 18 about the pivotal axis 21 the rotary axis 20a of the rear wheel 20 and thus the rear wheel 20 itself performs a pivotal motion about the pivotal axis 21. In the operating state according to FIGS. 1 and 2, in which the moveable device 2 is in its state ready to move, the fork 18 assumes such a pivotal position that the rear wheel 20 is approximately upright and thus its axis of rotation 20a extends approximately horizontally.

As already mentioned, the moveable device 2 is embodied in the type of a foldable scooter, in which the support board 4 and the handle support 6 can be folded into a space-saving idle position for a simplified transportation or a space-saving storage. For this purpose a fork-shaped link part 22 is fastened at the front and/or distal end 4b of the support board 4, fastened above the lateral bar 10 at the adjacent and/or proximal end 6b of the handle support 6, pivotal about the pivotal axis 23, which is shown schematically particularly in FIG. 1 as well as in FIG. 3, showing an intermediate state between the operating state shown in FIGS. 1 and 2 and a folded state. As further discernible from the schematic illustration of the pivotal axes 23 in FIG. 3, the pivotal axis 23 extends approximately parallel in reference to the rotary axes 12a, 14a of the two front wheels 12, 14 (FIG. 1), when they are in the straightly aligned position, and also approximately parallel in reference to the lateral bar 10 as well as further in reference to a virtual level stretched parallel in reference to the support board 4 and is also aligned approximately horizontally in the operating state according to FIGS. 1 and 2. Thus, the link part 22 and the proximal end 6*b* of the handle support 6 jointly form a folding link with the above-mentioned pivotal axis 23. In this context it shall be mentioned that a latching device is provided, not shown in the figures, in order to fixate the handle support 6 in reference to the support board 4 in the operating state shown in FIGS. 1 and 2 and this way prevent any unintentional folding.

In order to bring the device 2 from the operating state according to FIGS. 1 and 2 into an idle state the support board 4, after a potentially present latching device has been released, is pivoted about the pivotal axis 23 in the direction of the arrow B shown in FIG. 3 and thus in the direction to the handle support 6 until the support board 4 and the handle support 6 are folded together. In this position the moveable device 2 is in its idle state, as shown in FIGS. 4 and 5. While in the operating state according to FIGS. 1 and 2 the rear end 4*a* of the support board 4 assumes a maximum distance from the handle support 6 this distance is reduced to a minimum in the idle state according to FIGS. 4 and 5. In the exemplary embodiment shown the support board 4 and the handle support 6 are essentially parallel in reference to each other in the idle state according to FIGS. 4 and 5. The oblong section 16*a*, arched inwardly at the piece of luggage 16, shows such a width that it essentially accepts the support board 4 entirely, folded up in the idle state, as discernible in FIG. 5. Such an arrangement is advantageous in that in the idle state the support board 4 is arranged inserted at the piece of luggage 16 and thus essentially ends flush with the adjacent lateral surface of the piece of luggage 16 and is not disturbingly projecting therefrom. In order to bring the handle support 6 also into a space-saving position when necessary, it may comprise at least two sections arranged telescopically in reference to each other, which in the idle state can be pushed into each other to shorten the handle support 6 until the handle 8 rests on the top of the piece of luggage 16; however the ability for the handle support 6 to be telescopic is not shown in the figures.

As discernible from a comparison of the idle state shown in FIGS. 4 and 5 with the operating state shown in FIGS. 1 and 2 in connection with the intermediate state shown in FIG. 3, during the pivoting process of the support board 4 in the direction of the arrow B according to FIG. 3 from the operating state according to FIGS. 1 and 2 into the idle position according to FIGS. 4 and 5 the fork 18 is subject to a pivotal motion about the pivotal axis 21 in the direction of the arrow C according to FIG. 3. By the folding and/or pivotal motion in the direction of the arrow B according to FIG. 3 here the rear wheel 20 is brought from an essentially upright position in the operating state by a pivotal motion about approximately 90° into a so-called lateral position in the idle state in which it is now in a virtual level stretched by the support board 4. This way, the rear wheel 20 is in a space-saving arrangement in the idle state, because it forms a kind of extension in reference to the support board 4 and no longer projects therefrom perpendicularly. This space-saving position of the rear wheel 20 in the idle position is particularly well discernible in FIG. 5.

In order to automatically subject the fork 18, supported at the rear end 4*a* of the support board 4 pivotal about the pivotal axis 21, to the above-described pivotal motion in the direction of the arrow B according to FIG. 3 a particular mechanic is provided according to the invention, which converts the pivotal motion in the direction of the arrow B into a pivotal motion of the rear wheel 20 in the direction of the arrow C. As particularly discernible in FIGS. 3 and 4 a pull-push rod 28 is linked at a lateral bar 10 underneath the support board 4 embodied as an additional joint 26, which is guided at the bottom 4*b* of the support board 4 and coupled with its rear and/or distal end to a transmission 30. In the exemplary embodiment shown the transmission 30 is arranged at the bottom 4*b* of the rear end 4*a* of the support board 4, as discernible in FIGS. 6 and 7. This transmission 20 converts an axially longitudinal motion of the pull-push rod 28 into a rotary motion of the fork 18 about the pivotal axis 21.

As discernible from FIGS. 6 and 7 the transmission 30 shows two bearings 32, axially distanced from each other, and a rotary sheath 34, located between the bearings 32, and supported rotational about the pivotal axis 21 but locally fixed in the axial direction. In the jacket of the rotationally supported rotary sheath 34 two slot-shaped grooves 36 are embodied, opposite each other and extending angular and/or tilted in reference to the pivotal axis 21, through which a lateral pin 38 extends. The lateral pin 38 is arranged perpendicular in reference to the pivotal axis 21 and inserted with its ends not only through the two above-mentioned slot-shaped grooves 36 in the jacket of the rotary sheath 34 but also through adjacent longitudinal slots 40, which extend approximately in the longitudinal direction of the support board 4 and parallel in reference to the pull-push rod 28 and are embodied in sections 4*c* projecting from the bottom 4*b* of the support board 4. These two projecting sections 4*c* show an oblong form extending in the longitudinal direction of the support board 4 and are distanced from each other in order to form a chamber to accept the bearing 32 and the rotary sheath 34 therebetween. The rear and/or distal end of the pull-push rod 28 is guided loosely through the closer located bearing 32 into the rotary sheath 34 and here coupled stiffly with the lateral pin 38.

A movement of the pull-push rod 28 in the direction of its longitudinal axis therefore leads to a motion of the lateral pin 38 in the direction perpendicular in reference to its longitudinal axis, by which the lateral pin 38 moves along the longitudinal slots 40, in which the lateral pin 38 is guided. Simultaneously a mandatory guiding of the lateral pin 38 along the grooves 36 occurs in the rotary sheath 34. Due to the fact that the rotary sheath 34 is supported rotational but locally fixed in the axial direction and the slot-shaped grooves 36 are arranged angularly the mandatory guide of the rotary sheath 36 along the grooves 36 leads to a rotational motion of the rotary sheath 34. Thus, a movement of the pull-push rod 28 in the longitudinal axial direction is converted into a rotational motion of the rotary sheath 34 about the pivotal axis 21. Due to the fact that the fork 18 is connected to the rotary sheath 34 in a torque-proof fashion the rotational motion of the rotary sheath 34 leads to a respective rotational motion of the fork 18, and thus the rear wheel 20 about the pivotal axis 21 in the direction of the arrow C. While in FIG. 6 the rear wheel 20 is shown in the operating state and thus in its moving direction the rear wheel 20 according to the illustration of FIG. 7 is seen in its above-mentioned lateral position in the idle state of the moveable device 2.

FIG. 8 shows the linking of the pull-push rod with its proximal end 28*b* at the lateral bar 10. For this purpose, a link pin 42 is provided by which the proximal end 28*b* of the pull-push rod 28 is supported at the lateral bar 10 pivotal about a link axis 42*a*. This way, the joint 26 for linking the pull-push rod 28 to the lateral bar 10 is essentially formed by the proximal end 28*b* of the pull-push rod 28 and the link pin 42. Due to the fact that the pivotal axis 23, about which the support board 4 is folded and/or pivoted in reference to the handle support 6, extends at a distance from the axis of the link 42*a*, as discernible in FIG. 8, a pivotal motion of the support board 4 in reference to the handle support 6 leads to an axial longitudinal motion of the pull-push rod 28 in reference to the support board 4, which then results in the above-described rotary motion of the rotary sheath 34 of the transmission 30.

It shall be mentioned additionally that due to the above-described arrangement not only a folding and/or pivotal motion of the support board 4 in the direction of the arrow B (FIG. 3) and thus in the direction of the handle support 6 occurs to a pivotal motion of the rear wheel 20 from its upright position into its lateral position but that these motion processes are also possible in the inverse direction, thus upon the motion of the support board 4 from the idle state into the operating state and thus during the unfolding of the support board 4 and the handle support 6 the rear wheel 20 is rotated from its lateral position according to FIG. 7 back into its upright position according to FIGS. 1, 2, and 6.

FIGS. 9 through 12*a* show a moveable device 2*a* according to a preferred second embodiment. To the extent this second embodiment shows components equivalent to the respective components of the first embodiment according to FIGS. 1 through 8 or at least comparable thereto with regards to their function for the second embodiment the same reference characters are used as for the first embodiment, with here regarding these identical components, in order to prevent repetitions, reference is made to the respective parts of the description of the first embodiment.

A discernible difference of the second embodiment in reference to the first embodiment comprises that the lateral bar 10*a* carrying the proximal end 6*b* of the handle support 6 and rotationally supporting the two front wheels 12, 14 shows a round cross-section and thus is embodied as a round tube.

Further, FIG. 9 discloses a bearing part 44, with the lateral bar 10*a* fastened thereat, arranged with its proximal end 6*b* (at) the handle support 6, which projects from the bearing part 44 and the joint part 22 being fastened pivotally, which is (located) at the front and/or distal end 4*b* of the support board 4.

Although the moveable device 2*a* according to the second embodiment being shown in FIGS. 9 through 12*a* without a piece of luggage, however similar to the first embodiment provided to accept a piece of luggage or another payload, so that the moveable device 2*a* according to the second embodiment also accepts the function of a moveable piece of luggage or a rolling suitcase.

In order to fasten the piece of luggage on the tubular lateral bar 10*a* holding clips 60 are used for the second embodiment, as shown in FIGS. 10 and 10*a*. In the exemplary embodiment shown the holding clips 60 show a plate-shaped basic body 60*a*, which is fastened with its side facing the observer of FIG. 10*a* at a piece of luggage, not shown, and particularly at its bottom. As further discernible from FIG. 10*a*, at the opposite side of the plate-shaped basic body 60*a*, bracket and/or hook shaped latching sections 60*b* are formed, which encompass the lateral bar 10*a* in the assembled state, thus leading to the holding clips 60 according to FIG. 10 being detachably latched at the lateral bar 10*a*. The holding clips 60 are preferably made from plastic and are elastically arranged at the bracket and/or hook shaped curved engagement sections 60*b* for the detachable latching at the plate-shaped basic body 60.

Contrary to the first embodiment according to FIGS. 1 through 8 the moveable device 2*a* according to the second exemplary embodiment is shown in FIGS. 9 through 12*a*, to the extent discernible, with a steering mechanism 50. For this purpose, the two front wheels 12, 14 are each pivotal about a pivotal axis, which forms the steering axis and commonly is aligned approximately perpendicularly or approximately perpendicularly in reference to the rotary axis of the front wheels 12, 14 (cf. here the rotary axes 12*a*, 14*a* in FIG. 1) and in the operating state is essentially upright, as discernible in FIG. 9, discernible from the pivotal axis 14*b* allocated to the front wheel 14. At the two exterior ends of the lateral bar 10*a* therefore one axial bearing 52 each is pivotally supported about the above-mentioned pivotal axis, and the front wheels 12, 14 are pivotally supported at the axial bearings 52. Similar to the first embodiment, here too the handle support 6 serves as a steering rod, which by an appropriate pivoting of the handle 8 about its central and/or longitudinal axis 6*c* is pivotal in the steering direction. For this purpose the handle support 6 is respectively pivotally supported with its proximal end 6*b* in the bearing part 44 and provided with a pivotal lever 54, which in the exemplary embodiment shown is arranged at the bottom of the bearing part 44. As further discernible from FIG. 9 at the free end 54*a* of the rotary lever 54 steering rods 56 are linked, which are linked with their opposite end at the pivotal axial bearings 52 of the front wheels 12, 14. This way, any rotation of the handle support 6 leads to a motion of the steering rods 56 approximately in the direction of its longitudinal extension, with the axial bearing 52 of a front wheel 12 and/or 14 being stressed by pressure and the axial bearing 52 of the other front wheel 14 and/or 12 being subjected to tensile stress. This leads to the axial bearing 52 of both front wheels simultaneously being pivoted in the same direction. Here, the steering mechanism 50 converts a rotary motion of the handle support 6 about its longitudinal axis 6*c* into a simultaneous steering motion of the two front wheels 12, 14.

As particularly discernible from FIG. 11*a*, a radial pin 70 and matching to this radial pin 70 a respective recess 72 is formed at the free end 54*a* of the rotary lever 54 at the link 26, which is supported at the fork-shaped link part 22 rotational about a rotary axis 26*a* extending approximately parallel to the lateral bar 10*a* and linked to the pull-push bar 28. Here, the arrangement and the alignment of the rotary lever 54 and the recess 72 are made at its free end 54*a* as well as the pin 70 at the link 26 such that in the idle state the recess 72 accepts the radial pin 70 formed at the link 26 in its free end 54*a* of the rotary lever 54 and thus the pin 70 latches in the recess 72 when the handle support 6 is rotated into such a steering position, in which the front wheels 12, 14 are in their straight forward position, as shown in FIGS. 12 and 12*a*.

Accordingly the radial pin 70 at the link 26 and the recess 72 in the free end 54*a* of the rotary lever 54 jointly form a latching device for latching the steering mechanism 50 and thus the front wheels 12, 14 in the neutral central position for a straight forward motion. Here, the latching is only effective if the moveable device 2*a* is in its idle state according to FIGS. 10 through 12*a*, in which the support board 4 is folded in the direction towards the handle support 6. Because the transfer from the operating state into the idle state by pivoting the support board 4 in the direction towards the handle support 6 leads to the joint 26 also being subjected to a respective rotary motion. Only by such a rotary motion the pin 780 reaches the area of the rotary lever 54 and thus is 'aligned' with its free end 54*a* and the recess 72 formed therein, in order to then latch here, as discernible from a comparison of FIGS. 11 and 11*a* with FIGS. 12 and 12*a*. However, if the moveable device 2*a* is transferred into its operating state according to FIG. 9 the joint 26 is subjected to a pivotal motion moving the pin 70 out of the area of the rotary lever 54, where any latching of the pin 70 in the recess 72 cannot occur. The latter must be avoided anyways in the operating state because otherwise the steering would unintentionally be fixed. This is useless in normal operation, though, and thus it is undesired. Accordingly in the idle state of the support board 4 a latching of the steering is advantageous in order to prevent any enlargement of the effective width by rotation of the front wheels particularly in one of the two end positions, which otherwise required increased space in the idle position. Another advantage for the steering comprises that in the idle state of the moveable device 2a with a piece of luggage fastened thereat it can be used like a trolley and thus can be pulled by the user.

Finally it shall be pointed out that the "idle state" generally shall not be understood as an unused state for the moveable device, but the statement "idle state" relates to a situation in which the support board 4 is folded into an idle position at the handle support 6 and thus it is actually in an unused stated. This way, in the idle state the moveable device cannot be used as a scooter, however it is easily possible to use the moveable device in the idle state, for example as a trolley.

The invention claimed is:

1. A moveable device, comprising a planar element with at least one wheel supported rotational about a first rotary axis, a handle support carrying a handle at the distal end of the planar element, and an end proximal from the planar element, a folding link located adjacent to the first wheel, which connects the proximal end of the handle support to the planar element pivotally about a first pivotal axis such that in an operating state the handle support is aligned at an angle in reference to the planar element, perpendicular or almost perpendicular, and thus the distal end of the handle support shows a maximum distance from the planar element and in an idle state the distal end of the handle support shows a minimum distance from the planar element, and at least one second wheel supported rotational about a second rotary axis, which is arranged at the distant end of the planar element distanced from the arrangement comprising the first wheel and the folding link, characterized in that the second wheel is arranged at the planar element additionally pivotal about a second pivotal axis extending approximately in the direction of motion and coupled to the handle support via a mechanism, which converts a pivotal motion of the handle support in reference to the planar element about the first pivotal axis into a pivotal motion of the second wheel about the second pivotal axis such that the second rotary axis of the second wheel in the idle state shows a greater angle in reference to the planar element than in the operating state.

2. A device according to claim 1, wherein the second rotary axis of the second wheel shows an angle of approximately 90° in reference to the planar element in its idle state and an angle of approximately 0° in the operating state.

3. A device according to claim 1, wherein the mechanism comprises a pull-push rod, which is linked via a joint distanced from the folding link at the handle support, guided along the planar element and coupled to a transmission arranged at the planar element, which transmission converts a longitudinal motion of the pull-push rod into the pivotal motion of the second wheel about the second pivotal axis.

4. A device according to claim 1, wherein the second wheel is supported at a fork pivotal about the second rotary axis, which is arranged at the planar element pivotal about the second pivotal axis.

5. A device according to claim 1, wherein the handle support comprises at least two elements arranged telescopically in reference to each other.

6. A device according to claim 1, wherein the first wheel is supported pivotal about an additional angular third pivotal axis, extending approximately perpendicular in reference to the first rotary axis such that a pivotal motion about this third pivotal axis leads to a change of the direction of motion, the handle support represents a steering rod, and a steering mechanism being provided, which converts certain motions of the handle support into pivotal motions of the first wheel about the third pivotal axis.

7. A device according to claim 1, wherein the handle support comprises means for a centrally and/or symmetrical fastening of a piece of luggage at the handle support.

8. A device according to claim 1, further comprising latching means for a detachable latching of a piece of luggage at a section of the moveable device.

9. A device according to claim 1, wherein in the idle state the handle support and the planar element are approximately aligned parallel in reference to each other.

10. A device according to claim 1, wherein in the idle state the handle support and the planar element contact each other.

11. A device according to claim 3, wherein the joint is arranged at a point of the handle support located in the operating state at or below the bottom of the planar element and the pull-push rod being arranged at the bottom of the planar element.

12. A device according to claim 3, wherein the transmission is rotational about the second pivotal axis, however supported locally fixed in the axial direction, preferably comprising a sheath-like rotary body, with at least one groove being provided at its jacket, extending angular in reference to the second pivotal axis, with a pin-shaped cam element arranged at the pull-push rod and projecting into it.

13. A device according to claim 4, wherein the fork and the rotary body are axially aligned to each other and connected to each other in a torque-proof fashion.

14. A device according to claim 7, wherein a third wheel is provided at an axial distance from the first wheel, which is supported identical to the first wheel, with the axial distance being at least slightly greater than the width of the section located between the first and the second wheels of the piece of luggage to be fastened at the handle support.

15. A device according to claim 14, wherein the third wheel is supported additionally pivotal about an angular fourth pivotal axis, extending approximately perpendicular in reference to the first rotary axis, such that a pivotal motion about this fourth pivotal axis leads to a change in the direction of motion and a steering mechanism is provided to convert certain motions of the handle support also into pivotal motions of the third wheel about the fourth pivotal axis.

16. A device according to claim 15, further comprising latching means for latching the steering mechanism, which is embodied such that only in the idle state they can latch the steering mechanism in a neutral position, for a movement straight ahead.

17. A device according to claim 16, wherein the latching means comprise holding clips.

* * * * *